Patented Jan. 1, 1952

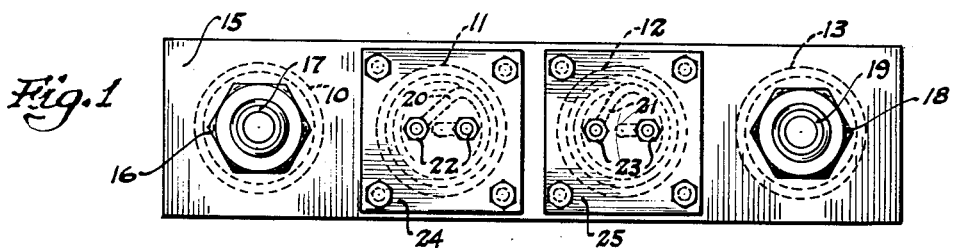
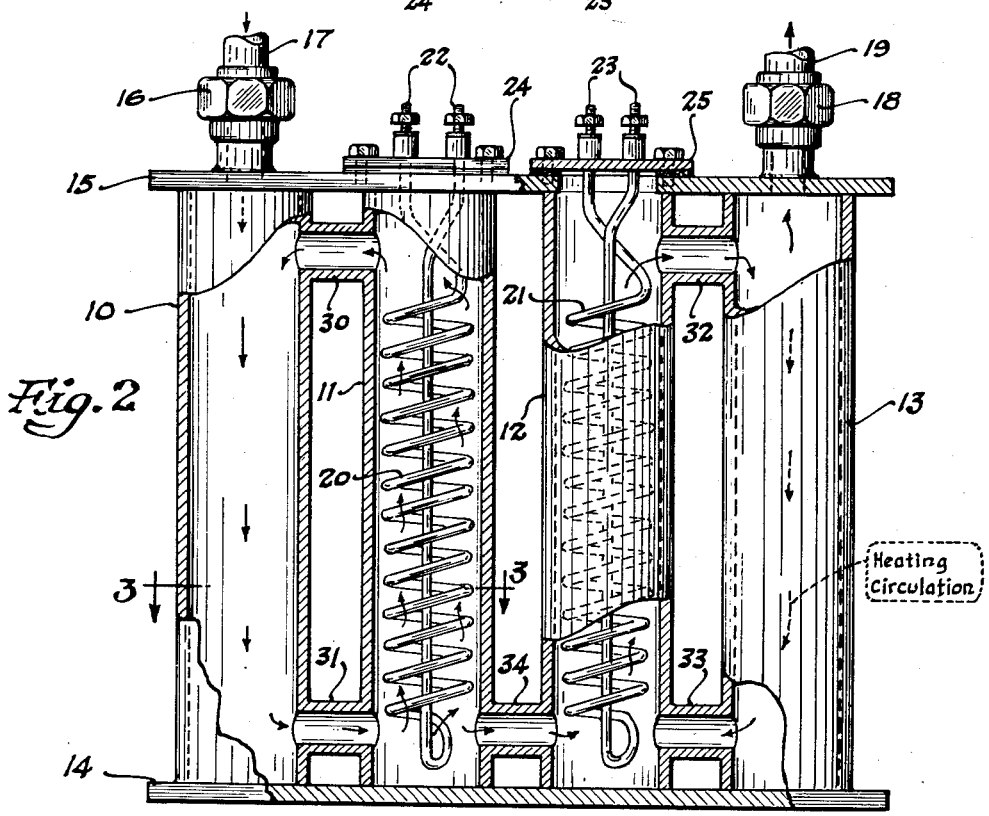
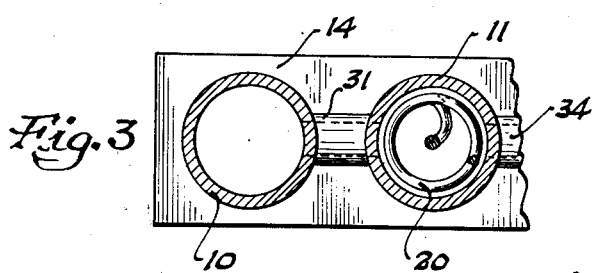

2,580,659

UNITED STATES PATENT OFFICE 2,580,659

BOOSTER WATER HEATER

Thomas H. Corbett, Chicago, Ill.

Application November 4, 1949, Serial No. 125,419

4 Claims. (Cl. 219—38)

This invention relates to electric water heating apparatus, and particularly to electrically powered booster heaters which are called upon intermittently to supply relatively large amounts of hot water.

There are many instances where hot water at an extremely high temperature is desirable, such, for example, as in restaurants, bars and the like where, by the use of extremely hot water, the processes of dish and glass washing may be materially simplified. Restaurants, bars and the like are usually located in relatively large buildings where the hot water for the restaurant is supplied from the main hot water heating system of the building, and since it is actually undesirable in most parts of a large building to have hot water at an extremely high temperature, it is the practice to supply such hot water from the main hot water heating system at a temperature from 140° F. to 165° F. While this temperature is sufficient and most desirable for most purposes the standards that are set by public health codes and the like for glass and dish washing operations usually require a much longer time, particularly in the rinsing operations on glasses and dishes, where water at a low temperature such as the foregoing is employed. It is, therefore, highly desirable to afford extremely high temperature water for rinsing purposes in the dish washing and glass washing operations, and heretofore the provision of this high temperature water has presented a rather difficult problem to restaurant operators and the like.

In view of the foregoing, it is an important object of the present invention to enable the hot water from the normal hot water supply in the restaurant or the like to be heated simply, easily and economically to a high temperature in quantities sufficient for rinsing purposes in dish washing and glass washing operations, and a related object is to afford a booster heater that is relatively small and compact in its form and which will operate effectively to supply limited quantities of extremely hot water at intervals coordinated with the operating cycle of dish and glass washing apparatus and the like.

In conventional water heaters the electric heating element is located in a position where it will be chilled by the incoming body of cool water following the withdrawal of hot water from the tank. When the heating element is chilled, its resistance is lowered so that it draws a high current and consumes a great deal of power. Such chilling of the element may occur even though there is still a large quantity of hot water left in the tank after the required amount has been withdrawn therefrom. If the heating system were of such a character that the electric heating element could efficiently heat the coldest water in the system and yet be continuously surrounded by water which is at a temperature close to that of the warmest water in the tank, there would be no sudden chilling of the element and consequently the consumption of the electric power would not reach needlessly high proportions.

Another object, therefore, of the present invention is to provide an improved electric water heater in which the electric heating element is so disposed that it efficiently heats all of the water in the heater while being surrounded at all times by the warmest water within the heater.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a plan view of an electric water heating unit embodying the principles of the invention;

Fig. 2 is a broken-away, side elevational view of said water heating unit; and

Fig. 3 is a cross-section on the line 3—3 of Fig. 2.

The booster water heater illustrated in the drawing comprises four vertically extending, cylindrical water containers on tanks 10, 11, 12 and 13, which are secured to or integral with a base plate 14 and a top plate 15. This unit is adapted for connection to conventional hot water plumbing system so as to receive warm or hot water at the temperature provided by the main hot water heating system, with the container 10 being connected at its upper end by a union 16 to a warm water inlet pipe 17, and the container 13 being connected at its upper end by a union 18 to a hot water outlet pipe 19. Inside each of the containers 11 and 12 there is disposed a vertically extending electric heating element 20 or 21 with terminals 22 or 23 adapted for connection to a source of electricity. The terminals 22 and 23 are mounted in insulating plates 24 and 25, which have water-tight connections with the top plate 15.

The containers 10 and 11 are interconnected near the top and bottom ends thereof by short pipes 30 and 31. When the heating element 20 is operating, water within the container 11 is heated, and a convection current flows in the manner indicated by the arrows through the pipes 30 and 31 and the containers 10 and 11. With this circulation of the water through the containers 10 and 11, all of the water therein becomes heated to a high temperature, assuming that the body of water in the system as a whole is stationary.

In similar fashion, the containers 12 and 13 are interconnected at the top and bottom ends thereof by short pipes 32 and 33. When the heating element 21 is energized, it heats the water in the container 12, and the water circulates by convection between the tanks 12 and 13. This heats the water within these tanks to a high temperature.

The tanks 11 and 12 are interconnected near the bottom ends thereof by a short pipe 34. The pipes 31, 33 and 34 provide a path for the flow of water from the container 10 over to the container 13 when hot water is being withdrawn from the container 13 through the pipe 19. It will be noted that such withdrawal of hot water from the system does not immediately lower the temperature of the water surrounding the heating coils 20 and 21. The bodies of water in the containers 11 and 12 tend to remain warm for a considerable length of time and do not cool down appreciably unless an exceptionally large quantity of hot water is consumed at one time. This is due to the isolation of the containers 11 and 12 from the containers 10 and 13, in which the bulk of the water movement takes place.

Inasmuch as the heating coils 20 and 21 are not suddenly exposed to incoming cooler water, they are not chilled to a point where the electric power consumption in these elements becomes very high. Furthermore, the quantity of water in each of the containers 11 and 12 is about equal to that in the associated container 10 or 13, so that equivalent volumes of water can simultaneously be heated and utilized. Since each of the heating elements 20 and 21 extends almost to the bottom of the heater unit and also to the top thereof, these elements have access to the coolest water in the heater while being maintained in a body of relatively hot water. This arrangement greatly improves the efficiency of the system.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In an electrically powered booster water heating apparatus adapted to be included in a warm water line between a main warm water source and a valved main outlet to substantially increase the water temperature during periods of closure of said valved main outlet, a first vertically extending water container having an inlet near its upper end for warm water, a second vertically extending water container separate from said first container and positioned alongside said first container and having a hot water outlet near its lower end, a vertically extending electric water heating element in said second container, and pipes respectively located near the top and bottom ends of said containers interconnecting the same to provide passages for the circulation of water by convection past said heating element and through both of said containers during such periods.

2. In an electrically powered booster type water heating apparatus adapted to be included in a warm water line between a main warm water source and a valved main outlet to substantially increase the water temperature during periods of closure of said valved main outlet, a vertically extending tank for storing heated water, said tank having a hot water inlet, an auxiliary water container having approximately the same capacity as said tank, conduits respectively interconnecting the upper ends and the lower ends of said tank and said container, an electric heating element in said container extending substantially the entire distance between said conduits so that a portion of said element contacts the coolest water in the apparatus, while the element as a whole is immersed in a relatively large body of warm water isolated from said tank except for the movement of water by convection currents through said conduits, and an outlet from said container adjacent to the lower end.

3. In a booster type electric water heating apparatus, four vertically extending tanks arranged in spaced side-by-side relationship, with the first of said tanks having a hot water inlet at the top thereof, and the fourth one of said tanks having a final water outlet at the top thereof for discharging water that has been heated to a higher temperature, conduits interconnecting the first and second tanks near the upper and lower ends thereof, conduits interconnecting the third and fourth tanks near the upper and lower ends thereof, electric water heating elements respectively disposed in said second and third tanks, with said interconnecting conduits providing for the circulation of water by convection through said first and second tanks and through said third and fourth tanks, and conduit means connecting the lower part of said first tank to the lower part of said fourth tank for enabling water to flow through the apparatus from said inlet to said outlet.

4. The apparatus defined in claim 3, wherein said second and third tanks are located between said first and fourth tanks, and said conduit means includes the interconnecting conduits near the lower ends of all of said tanks.

THOMAS H. CORBETT.

REFERENCES CITED

The following references are of record in the file of this patent:

UNITED STATES PATENTS

| Number | Name | Date |
|---|---|---|
| 1,318,237 | Sordi | Oct. 7, 1919 |
| 1,831,244 | Hartsell | Nov. 10, 1931 |
| 2,140,389 | Lum | Dec. 13, 1938 |
| 2,237,808 | Berg | Apr. 8, 1941 |